US008762300B2

(12) United States Patent
Lu et al.

(10) Patent No.: US 8,762,300 B2
(45) Date of Patent: Jun. 24, 2014

(54) METHOD AND SYSTEM FOR DOCUMENT CLASSIFICATION

(75) Inventors: Yang-Cheng Lu, Taipei (TW); Jen-Nan Chen, Taipei (TW); Yu-Chen Wei, Taipei (TW)

(73) Assignee: Ming Chuan University, Taipei (TW)

( * ) Notice: Subject to any disclaimer, the term of this patent is extended or adjusted under 35 U.S.C. 154(b) by 219 days.

(21) Appl. No.: 13/275,606

(22) Filed: Oct. 18, 2011

(65) Prior Publication Data

US 2013/0097104 A1   Apr. 18, 2013

(51) Int. Cl.
*G06F 15/18* (2006.01)

(52) U.S. Cl.
USPC .......................................................... 706/12

(58) Field of Classification Search
None
See application file for complete search history.

(56) References Cited

U.S. PATENT DOCUMENTS

| 7,469,246 | B1 * | 12/2008 | Lamping .............................. 1/1 |
| 7,840,521 | B2 * | 11/2010 | Aoki ............................... 706/50 |
| 7,849,087 | B2 | 12/2010 | Goutte et al. |
| 2006/0095521 | A1 * | 5/2006 | Patinkin ........................ 709/206 |
| 2009/0216693 | A1 * | 8/2009 | Rujan et al. ...................... 706/12 |
| 2009/0300007 | A1 * | 12/2009 | Hiraoka ............................ 707/5 |
| 2011/0191098 | A1 * | 8/2011 | Thomas et al. ................... 704/9 |
| 2012/0259855 | A1 * | 10/2012 | Mizuguchi et al. ........... 707/739 |

FOREIGN PATENT DOCUMENTS

JP             11316763 A   * 11/1999

OTHER PUBLICATIONS

English translation of the above JP 11316763 A patent. Published Nov. 16, 1999.*
Search Report and Written Opinion issued by the Intellectual Property Office of Singapore for the corresponding Singaporean application, (Mar. 29, 2012).

* cited by examiner

*Primary Examiner* — Jeffrey A Gaffin
*Assistant Examiner* — Dave Misir
(74) *Attorney, Agent, or Firm* — Gottlieb, Rackman & Reisman, P.C.

(57) ABSTRACT

The present invention provides a method for document classification, especially an adaptive learning method for document classification. The document includes a plurality of feature words. The method includes steps of calculating a plurality of similarities between the document and a categorical basic knowledge; calculating a first ratio of a first largest similarity to a second largest similarity of the plurality of similarities; storing the feature words of the document as an extensive categorical knowledge when the first ratio is larger than a first threshold value; and updating the categorical basic knowledge by using the extensive categorical knowledge.

15 Claims, 2 Drawing Sheets

METHOD AND SYSTEM FOR DOCUMENT CLASSIFICATION

FIELD OF THE INVENTION

The present invention relates to a method and system for document classification, and more particularly to a method and system for document classification via adaptive learning.

BACKGROUND OF THE INVENTION

With the fast growing of the internet, many electronic services, especially the electronic news services, are growing with each passing day so we could obtain many useful data. In addition to news on the news website, how to manage these data is quite an important work. However, the number of news is growing every day, and the manual classification is time-consuming and laborious. Furthermore, problems with the factor of subjective determination and the difficulties of obtaining knowledge are faced. The general method of managing data is automatic classification. The automatic classification utilizes the machines to learn features of every category document and automatically classify the testing data. The advantages of the automatic classification are that the classification can be completed in short time, and the results are more objective and consistent. Currently, the extensively applied document classifications include word sense disambiguation, information retrieval, information filtering, web classification, computer-assisted reading, etc.

With regard to automatic classification, the traditional learning methods are primary focused on static knowledge. The disadvantages of these methods are that single learning of training models is adopted in every category, large training data are required, and continuous updating of the learned knowledge in every category according to testing data is unachievable. For example, the invention of the Taiwan Patent No. 1249113 lacks dynamic knowledge adjustment (adaptive learning). In addition, the problem of the non-relationship between speculation of the unknown category and the feature of the testing corpus also exists in the current classification system.

In order to overcome the drawbacks in the prior art, a method and system for document classification are provided in the present invention. The particular design in the present invention not only solves the problems described above, but also is easy to be implemented. Thus, the present invention has the utility for the industry.

SUMMARY OF THE INVENTION

In order to overcome the drawbacks in the static learning, the present invention designs an adaptive learning method. The basic concept of the adaptive learning method is starting with basic core glossaries from every category, and then the glossaries from a simplex testing corpus associated with a testing corpus but not located in the basic core glossaries are extracted. These new knowledge is subsequently used to deal with other complicated testing corpora.

The present invention provides an adaptive learning method for document classification. Firstly, basic core knowledge is collected in every field. Secondly, simplex documents are solved by the established basic knowledge, i.e. calculating similarities of the feature words in a document and the basic knowledge in every category, and comparing a largest similarity with a second largest similarity of those similarities. Then, the category corresponding to the value with a larger difference serves as the category of the documents. Thirdly, the specific domain knowledge of the marked documents is searched to expand basic core knowledge and solve the categories of the complicated corpora of the documents. Finally, the above mentioned steps are repeated to classify a specific unmarked document as a default category according to a majority category of the unmarked documents, until the growth of the marked documents is stopped.

In accordance with an aspect of the present invention, a method for classifying a document including a plurality of feature words is provided. The method includes steps of calculating a plurality of similarities between the document and a categorical basic knowledge; calculating a first ratio of a first largest similarity to a second largest similarity of the plurality of similarities; storing the feature words of the document as an extensive categorical knowledge when the first ratio is larger than a first threshold value; and updating the categorical basic knowledge by using the extensive categorical knowledge.

In accordance with another aspect of the present invention, a system for classifying a document is provided. The document includes a plurality of feature words. The system includes a processing unit calculating a plurality of similarities between the document and a categorical basic knowledge and calculating a ratio of a first largest similarity to a second largest similarity of the plurality of similarities; and a first buffer unit storing the plurality of feature words of the document as an extensive categorical knowledge when the ratio is larger than a threshold value, wherein the processing unit updates the categorical basic knowledge by means of the buffer unit.

In accordance with a further aspect of the present invention, a method for updating a categorical basic knowledge is provided. The method includes steps of providing a plurality of feature words and the categorical basic knowledge; calculating a plurality of similarities between the feature words and the categorical basic knowledge; and updating the categorical basic knowledge according to the plurality of similarities.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
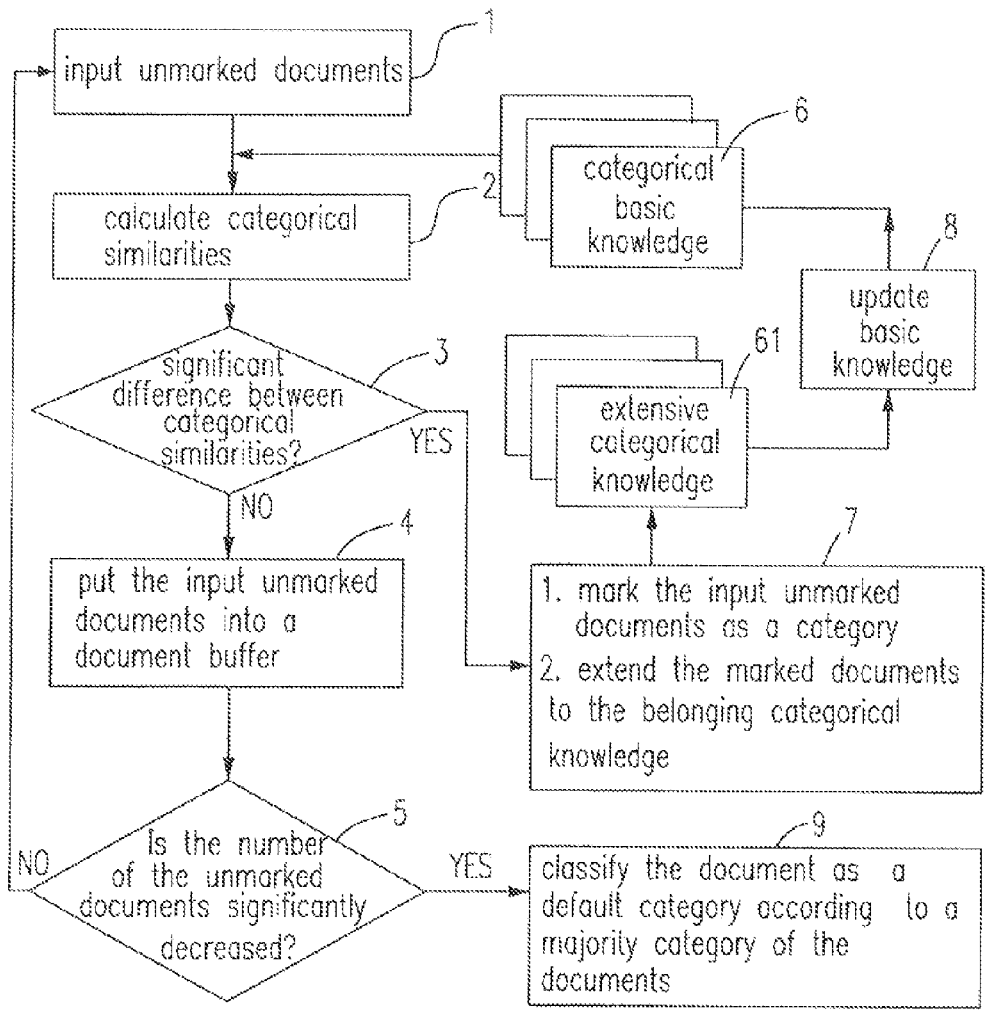
FIG. 1 shows a flow chart of the adaptive learning method in the present invention.

Please refer to FIG. 1, which is a flow chart of the adaptive learning method in the present invention. FIG. 1 includes some important core modules of the present invention, and the description thereof are as follows.

Firstly, a user inputs unmarked documents (step 1). The source of the categorical basic knowledge 6 is built-in in the system. The basic knowledge is constructed as preliminary knowledge seeds. The number of the preliminary knowledge seeds is unlimited. The input unmarked documents are original documents. The similarities between the original documents and every categorical basic knowledge are calculated (step 2). The calculation is performed by using either of the following formulas:

1. Dice coefficient $$Sim(X, Y) = \frac{2\sum x_i \times y_i}{\sum x_i^2 + \sum y_i^2} \quad (1)$$

2. Cos coefficient $$Sim(X, Y) = \frac{\sum x_i \times y_i}{\sum x_i^2 \times \sum y_i^2} \quad (2)$$

3. *Jaccard* coefficient $$Sim(X, Y) = \frac{\sum x_i \times y_i}{\sum x_i^2 + \sum y_i^2 - \sum x_i \times y_i} \quad (3)$$

X means the unmarked document, and Y means the knowledge feature in the category. $x_i$ means the glossary feature of the document X, and $y_i$ means the knowledge feature of the category Y.

Secondly, the similarities of categories are compared (step 2). The similarities between the original documents and every categorical basic knowledge are sorted from the largest one to the smallest one. The ratio of a largest similarity to a second largest similarity is calculated. The calculation is performed by using either of the following formulas:

$$\frac{S^*}{S'} \geq \alpha \quad (4)$$

$$S^* = \max_{k=1,\ldots,n} \{Sim(X, Y_k)\} \quad (5)$$

$$l = \underset{k}{\mathrm{argmax}} Sim(X, Y_k) \quad (6)$$

$$S' = \max_{\substack{k=1,\ldots,n \\ k \neq l}} \{Sim(X, Y_k)\} \quad (7)$$

$\alpha$ is a threshold which is larger than 1 and ranges between 1 and 2. Because of the limited category knowledge in the first time, a larger value is required for the initial $\alpha$ value in order to decrease the error rate of marking the category. That is, the difference between the similarity of the largest and the second largest categories is required (step 3). This step is important because the probability and identification degree of correctly marking the category would be higher. Accordingly, the default value is 2 in the first time.

If the ratio is larger than the default value of the threshold, the input unmarked documents is marked as a category corresponding to the largest similarity (step 7). Then the feature words of the input unmarked documents are put into the extensive categorical knowledge 61.

If the ratio is not larger than the default value of the threshold, the input unmarked documents are put into a document buffer (step 4). Then the number of the unmarked documents is determined (step 5). When a ratio of an amount of the present unmarked documents to that of the previous unmarked documents in the document buffer is larger than a default threshold value, the document is classified as a default category according to a majority category of the documents (step 9). When the ratio is not larger than the default threshold value, the extensive categorical knowledge is classified according to the belonging categorical knowledge, and the basic knowledge is updated thereby (step 8). Subsequently the category similarities of the unclassified documents are calculated according to the categorical basic knowledge (step 2). Then the above-mentioned steps are repeated until all the documents are marked.

Figure 2:
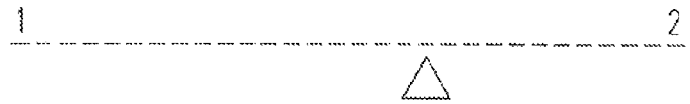
FIG. 2 shows the concept of the threshold setting in the present invention.

Please refer to FIG. 2, which shows the concept of the threshold setting in the present invention. In order to set the threshold more flexibly, the indistinct method is adopted. The threshold ranging between 1 and 2 is changed through moving the shaft ($\Delta$) by the user.

Figure 3:
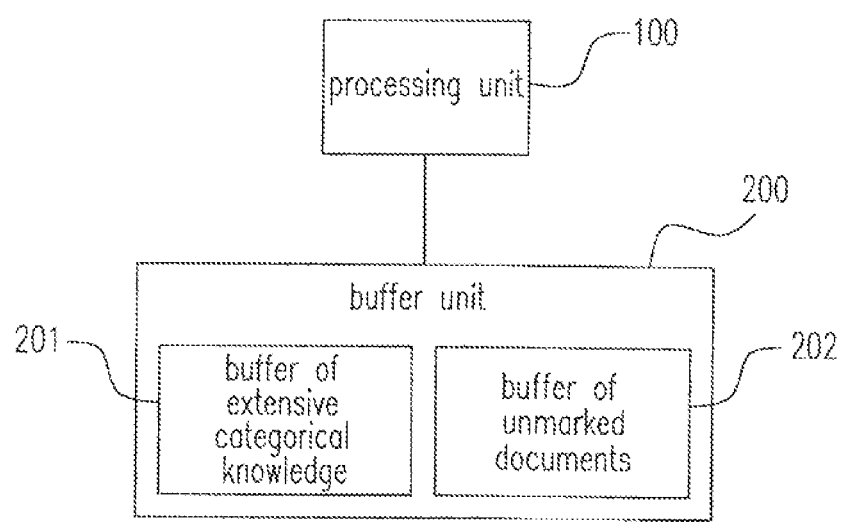
FIG. 3 shows a system for document classification in the present invention.

Please refer to FIG. 3, which shows the system for document classification in the present invention. The system includes a processing unit 100 and a buffer unit 200. The buffer unit 200 includes a buffer of extensive categorical knowledge 201 and a buffer of unmarked documents 202. The processing unit 100 calculates a plurality of similarities between the document and the categorical basic knowledge, and calculates a ratio of a first largest similarity to a second largest similarity of the plurality of similarities. The buffer unit 200 marks the document into a category of the categorical basic knowledge or stores the plurality of feature words of the document in the buffer of extensive categorical knowledge 201 when the ratio is larger than the threshold. The processing unit 100 updates the categorical basic knowledge via the extensive categorical knowledge 201. The buffer unit 200 stores the document in the buffer of unmarked documents 202 to mark the document as an unmarked document when the ratio is smaller than the threshold.

The embodiment is exemplified by analyzing a lexical meaning of "virus" in the documents. Table 1 shows the core knowledge feature of an ambiguity. Every ambiguity of the corpus is disambiguated according to the core knowledge feature. Table 2 shows the disambiguation of "virus" in the context of the corpus. Firstly, by comparing the core knowledge feature of the lexical meaning of "virus" with the context of "virus", the lexical meanings of "virus" of the context in the example sentences 6, 7, 9 and 10 are marked as "computer virus". Subsequently, these marked contexts of the lexical meaning are input to the corresponding core knowledge feature, as shown in Table 3.

TABLE 1

Core knowledge feature of "virus"

| Concept | Vocabulary feature | Part of speech |
|---|---|---|
| Microorganism | Hepatitis B virus, *amoeba*, rhabdovirus, pathogen, virus, *bacillus*, microorganism, bacteria . . . | N(noun) |
| Software, damage | Virus, computer virus | N |

TABLE 2

Context of "virus" included in the corpus

Context of the ambiguities

1 The exhibition also exhibits a new drug for the influenza virus designed by computers from the England GlaxoSmithKline and Australia Organization for Industry Development and Research
2 Currently, life science research in the world includes animal or plant genome, the AIDS virus, transgenetic animals and plants, new drug design and gene therapy

TABLE 2-continued

Context of "virus" included in the corpus

Context of the ambiguities

3 The most advanced water machine and technologies imported from the America could produce impurity-free, pathogen-free, virus-free, new ultra-purified water
4 The French researchers consider that the AIDS is originated from the monkey virus
5 The cruelest part is that the troops of 1644 use human beings for bacteria and virus infection tests, and various biological, chemical, medical experiments
6 This computer virus is first discovered in 1994, and most antivirus software could detect and clean it
7 Some experts suggest that every factory should confirm that the launching discs are free of the computer virus; the computer users should also use the original disc and anti-computer virus software
8 With the prevalence of discs, more and more factories and stores sell or give discs with software so that the damage of the virus in the discs are getting higher and higher
9 Since these discs are read-only, this virus could not be cleaned; the only method to ensure the safety of the user computer is to destroy these discs
10 The disc along with the English magazine contains the computer virus

TABLE 3

Expansion of the core knowledge feature of the glossary "virus"

| Concept | Vocabulary feature | Part of speech |
|---|---|---|
| Microorganism | Hepatitis B virus, *amoeba*, rhabdovirus, pathogen, virus, *bacillus*, microorganism, bacteria . . . | N |
| | Influenza, drug, AIDS . . . | |
| software, damage | Virus, computer virus | N |
| | Software, disc, computer . . . | |

The unmarked lexical meaning could be resolved according to the marked contexts and the relative lexical meaning. For example, the lexical meaning of "virus" in the example sentence 2 is the "biological virus" because the features "AIDS" and "drug" are included in the "biological virus". If there are still some unmarked lexical meanings, the relative vocabulary feature of every lexical meaning is expanded according to the corpuses of previous marked lexical meanings. Finally, by repeating these steps, vocabularies with higher frequency are statistical analyzed as a default lexical meaning of other unmarked lexical meaning until the number of the growth of the marked lexical meaning is slow.

In order to determine the contribution degree of every expanded vocabulary feature in the lexical meaning, the statistic method, such as the entropy, $X^2$, TFIDF and mutual information, is used to calculate the contribution degree of every vocabulary feature in the lexical meaning and solve the unmarked lexical meaning in the previous step. The example of the entropy is as follows.

Calculating Steps of Entropy Weighting

Step 1: $a_{ij}$ which represents the frequency of the vocabulary feature $f_j$ appearing in the lexical meaning $S_i$ is normalized. The normalized values are represented as $d_{ij}$.

Step 2: $d_{ij}$ is converted into the probability $p_{ij}$.

Step 3: the entropy $e_j$ of every vocabulary feature is calculated with $p_{ij}$.

$$e_j = -k \sum_{i=1}^{m} P_{ij} \ln P_{ij}; \qquad (8)$$

wherein $k=1/\ln(m)$, and $i=1, 2, 3, \ldots, m$. m is the number of ambiguity of vocabulary, and $j=1, 2, 3, \ldots, n$. n is the number of the vocabulary feature.

Step 4: A relative objective weighting value of the vocabulary feature $\lambda_j$ is calculated, wherein $\lambda j (1-ej)/(n-E);$ (9)

$E=\Sigma e_j;$ and (10)

n is the number of the vocabulary feature.

The above algorithm is introduced in the following case. Assume that the vocabulary V has four different lexical meanings, which are represented as $S_1$, $S_2$, $S_3$ and $S_4$ respectively. There are six vocabulary features in $S_1$, $S_2$, $S_3$ and $S_4$, which are represented as $f_1$, $f_2$, $f_3$, $f_4$, $f_5$ and $f_6$ respectively, and the frequencies thereof are shown in Table 4. Firstly, the frequencies are normalized to obtain a normalized value $d_{ij}$, as shown in Table 5(a). Then, the normalized value $d_1$ is converted into the probability $p_{ij}$, as shown in Table 5(b). Next, the entropy $e_j$ is calculated with p, as shown in Table 5(c). Finally, the relative objective weighting value of every vocabulary feature is obtained, as shown in Table 5(d). It is observed from Table 4 that four lexical meanings all include the vocabulary feature $f_1$ so that the contribution degree of the vocabulary feature $f_1$ is lower. However, the vocabulary feature $f_5$ only appears in $S_3$ so that the contribution degree of the vocabulary feature $f_5$ is higher. Accordingly, calculating the weighting value of the vocabulary feature by the entropy is reliable.

TABLE 4

Frequencies of every vocabulary feature in different lexical meanings of vocabulary

| | | Vocabulary feature | | | | | |
|---|---|---|---|---|---|---|---|
| | | $F_1$ | $f_2$ | $f_3$ | $f_4$ | $f_5$ | $f_6$ |
| Lexical meaning | $S_1$ | 75 | 2 | 0 | 9 | 0 | 3 |
| | $S_2$ | 60 | 15 | 5 | 6 | 0 | 4 |
| | $S_3$ | 54 | 0 | 0 | 7 | 5 | 3 |
| | $S_4$ | 66 | 0 | 10 | 5 | 0 | 8 |

TABLE 5

Entropy and the relative objective weighting value of every vocabulary feature in different lexical meanings of vocabulary

| | | Vocabulary feature | | | | | |
|---|---|---|---|---|---|---|---|
| | | $f_1$ | $f_2$ | $f_3$ | $f_4$ | $f_5$ | $f_6$ |
| | | (a) Normalization of the vocabulary feature | | | | | |
| Lexical meaning | $S_1$ | 75/75 | 2/15 | 0/10 | 9/9 | 0/5 | 3/8 |
| | $S_2$ | 60/75 | 15/15 | 5/10 | 6/9 | 0/5 | 4/8 |

TABLE 5-continued

Entropy and the relative objective weighting value of every vocabulary feature in different lexical meanings of vocabulary

| | | Vocabulary feature | | | | | |
|---|---|---|---|---|---|---|---|
| | | $f_1$ | $f_2$ | $f_3$ | $f_4$ | $f_5$ | $f_6$ |
| | $S_3$ | 54/75 | 0/15 | 0/10 | 7/9 | 5/5 | 3/8 |
| | $S_4$ | 66/75 | 0/15 | 10/10 | 5/9 | 0/5 | 8/8 |
| (b) Conversion of the normalized value $d_{ij}$ into the probability $p_{ij}$ | | | | | | | |
| Lexical meaning | $S_1$ | 0.29 | 0.12 | 0.00 | 0.33 | 0.00 | 0.17 |
| | $S_2$ | 0.24 | 0.88 | 0.33 | 0.22 | 0.00 | 0.22 |
| | $S_3$ | 0.21 | 0.00 | 0.00 | 0.26 | 1.00 | 0.17 |
| | $S_4$ | 0.26 | 0.00 | 0.67 | 0.19 | 0.00 | 0.44 |
| (c) Calculation of the entropy $e_j$ of every vocabulary feature with $p_{ij}$ | | | | | | | |
| Lexical meaning | $S_1$ | 0.36 | 0.25 | 0.00 | 0.37 | 0.00 | 0.30 |
| | $S_2$ | 0.34 | 0.11 | 0.37 | 0.33 | 0.00 | 0.33 |
| | $S_3$ | 0.33 | 0.00 | 0.00 | 0.35 | 0.00 | 0.30 |
| | $S_4$ | 0.35 | 0.00 | 0.27 | 0.32 | 0.00 | 0.36 |
| Sum | | 1.38 | 0.37 | 0.63 | 1.36 | 0.00 | 1.30 |
| k | | 0.72 | 0.72 | 0.72 | 0.72 | 0.72 | 0.72 |
| Entropy | | 0.995075 | 0.26468 | 0.457463 | 0.984455 | 0 | 0.935447 |
| (d) Relative objective weighting value of every vocabulary feature | | | | | | | |
| Entropy | | 0.995075 | 0.26468 | 0.457463 | 0.984455 | 0 | 0.935447 |
| Relative objective weighting value | | 0.002084 | 0.311196 | 0.229608 | 0.006579 | 0.423212 | 0.02732 |

Embodiments

1. A method for classifying a document including a plurality of feature words, the method comprising steps of:
   calculating a plurality of similarities between the document and a categorical basic knowledge;
   calculating a first ratio of a first largest similarity to a second largest similarity of the plurality of similarities;
   storing the feature words of the document as an extensive categorical knowledge when the first ratio is larger than a first threshold value; and
   updating the categorical basic knowledge by using the extensive categorical knowledge.

2. The method of Embodiment 1, wherein the step of calculating the plurality of similarities is performed based on the plurality of feature words.

3. The method of any one of Embodiments 1-2, further comprising a step of marking the document into a category of the categorical basic knowledge when the first ratio is larger than the first threshold value.

4. The method of any one of Embodiments 1-3, wherein the first threshold value ranges between 1 and 2.

5. The method of any one of Embodiments 1-4, wherein the first threshold value is set by a user.

6. The method of any one of Embodiments 1-5, further comprising a step of:
   storing the document into an unmarked-document buffer when the first ratio is smaller than the first threshold value.

7. The method of any one of Embodiments 1-6, further comprising steps of:
   calculating a second ratio of an amount of present unmarked documents to that of previous unmarked documents in the unmarked-document buffer;
   classifying a specific unmarked document as a default category according to a majority category of the unmarked documents when the second ratio is larger than a second threshold value; and
   updating the categorical basic knowledge by the extensive categorical knowledge when the second ratio is one of ratios smaller than and equal to the second threshold value.

8. The method of any one of Embodiments 1-7, wherein the second threshold value ranges between 1 and 2.

9. The method of any one of Embodiments 1-8, wherein the second threshold value is set by a user.

10. The method of any one of Embodiments 1-9, wherein the plurality of similarities are calculated based on at least one selected from a group consisting of a Dice coefficient, a Cos coefficient and a Jaccard coefficient.

11. A system for classifying a document comprising a plurality of feature words, the system comprising:
    a processing unit calculating a plurality of similarities between the document and a categorical basic knowledge and calculating a ratio of a first largest similarity to a second largest similarity of the plurality of similarities; and
    a first buffer unit storing the plurality of feature words of the document as an extensive categorical knowledge when the ratio is larger than a threshold value, wherein the processing unit updates the categorical basic knowledge by means of the buffer unit.

12. The system of Embodiment 11, further comprising a second buffer unit storing the document as an unmarked-document when the ratio is smaller than the first threshold value.

13. The system of any one of Embodiments 11-12, wherein the plurality of similarities are calculated based on at least one selected from a group consisting of a Dice coefficient, a Cos coefficient and a Jaccard coefficient.

14. A method for updating a categorical basic knowledge, comprising steps of:
    providing a plurality of feature words and the categorical basic knowledge;
    calculating a plurality of similarities between the feature words and the categorical basic knowledge; and updating the categorical basic knowledge according to the plurality of similarities.

15. The method of Embodiment 14, wherein the plurality of similarities are calculated based on at least one selected from a group consisting of a Dice coefficient, a Cos coefficient and a Jaccard coefficient.

What the claimed is:

1. A method for classifying a document including a plurality of feature words, the method comprising steps of:
    calculating a plurality of similarities between the document and a categorical basic knowledge;
    calculating a first ratio of a first largest similarity to a second largest similarity of the plurality of similarities;
    storing the feature words of the document as an extensive categorical knowledge when the first ratio is larger than a first threshold value; and
    updating the categorical basic knowledge by using the extensive categorical knowledge.

2. A method as claimed in claim 1, wherein the step of calculating the plurality of similarities is performed based on the plurality of feature words.

3. A method as claimed in claim 1, further comprising a step of marking the document into a category of the categorical basic knowledge when the first ratio is larger than the first threshold value.

4. A method as claimed in claim 1, wherein the first threshold value ranges between 1 and 2.

5. A method as claimed in claim 1, wherein the first threshold value is set by a user.

6. A method as claimed in claim 1, further comprising a step of:
    storing the document into an unmarked-document buffer when the first ratio is smaller than the first threshold value.

7. A method as claimed in claim 6, further comprising steps of:
    calculating a second ratio of an amount of present unmarked documents to that of previous unmarked documents in the unmarked-document buffer;
    classifying a specific unmarked document as a default category according to a majority category of the unmarked documents when the second ratio is larger than a second threshold value; and
    updating the categorical basic knowledge by the extensive categorical knowledge when the second ratio is one of ratios smaller than and equal to the second threshold value.

8. A method as claimed in claim 7, wherein the second threshold value ranges between 1 and 2.

9. A method as claimed in claim 7, wherein the second threshold value is set by a user.

10. A method as claimed in claim 1, wherein the plurality of similarities are calculated based on at least one selected from a group consisting of a Dice coefficient, a Cos coefficient and a Jaccard coefficient.

11. A system for classifying a document comprising a plurality of feature words, the system comprising:
    a processing unit calculating a plurality of similarities between the document and a categorical basic knowledge and calculating a ratio of a first largest similarity to a second largest similarity of the plurality of similarities; and
    a first buffer unit storing the plurality of feature words of the document as an extensive categorical knowledge when the ratio is larger than a threshold value, wherein the processing unit updates the categorical basic knowledge by means of the buffer unit.

12. A system as claimed in claim 1, further comprising a second buffer unit storing the document as an unmarked-document when the ratio is smaller than the first threshold value.

13. A system as claimed in claim 11, wherein the plurality of similarities are calculated based on at least one selected from a group consisting of a Dice coefficient, a Cos coefficient and a Jaccard coefficient.

14. A method for updating a categorical basic knowledge, comprising steps of:
    providing a plurality of feature words and the categorical basic knowledge;
    calculating a plurality of similarities between the feature words and the categorical basic knowledge; and
    updating the categorical basic knowledge according to the plurality of similarities.

15. A method as claimed in claim 14, wherein the plurality of similarities are calculated based on at least one selected from a group consisting of a Dice coefficient, a Cos coefficient and a Jaccard coefficient.

* * * * *